L. STEINBERGER.
SUSPENSION MEANS FOR STRAIN INSULATORS.
APPLICATION FILED NOV. 24, 1913.
1,231,090.  Patented June 26, 1917.
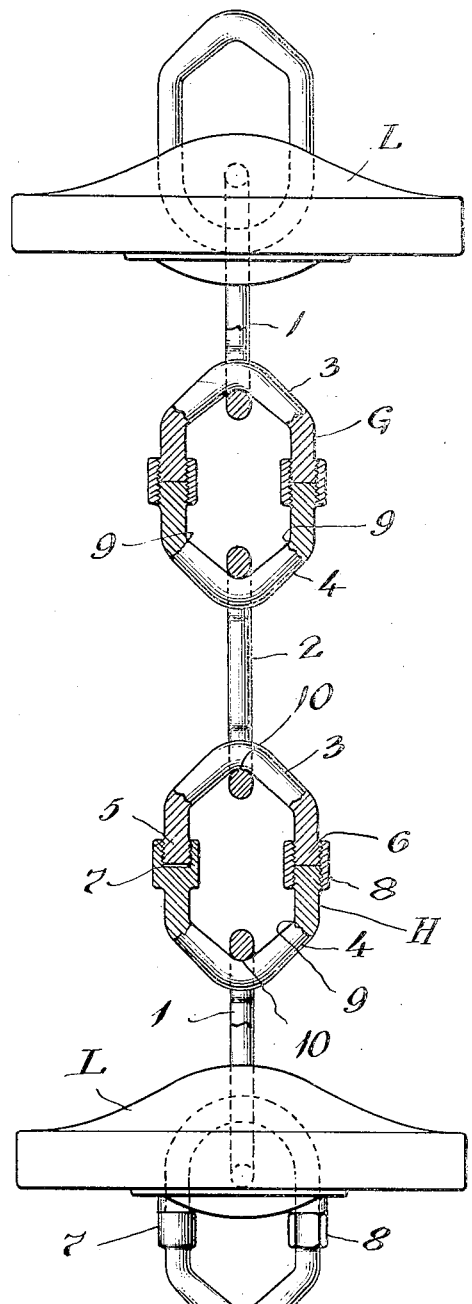
Witnesses:
John J. Kittel
L. [signature]
Inventor
Louis Steinberger
By his Attorney
Charles H. Wilcox

UNITED STATES PATENT OFFICE.

LOUIS STEINBERGER, OF BROOKLYN, NEW YORK.

SUSPENSION MEANS FOR STRAIN-INSULATORS.

1,231,090.  Specification of Letters Patent.  Patented June 26, 1917.

Application filed November 24, 1913. Serial No. 802,685.

*To all whom it may concern:*

Be it known that I, LOUIS STEINBERGER, residing at Brooklyn, in the county of Kings and State of New York, have invented certain new and useful Improvements in Suspension Means for Strain-Insulators, of which the following is a specification.

This invention relates to a suspension and connecting means for strain insulators, and the like.

The principal object of the invention is to provide an improved and efficient means whereby strain insulators may be quickly and conveniently attached to, or detached from a support.

A further and more detailed object is to provide a strain or connecting member which, comprises a substantially closed link or eye, but which link or eye may be readily opened for facilitating the introduction of a supporting part or the like.

A further object is to provide a device which may be used as a separately formed connecting member for connecting adjacent units of a chain type insulator, or which may be molded partly within the material of the unit so as to serve as one of the strain members of said unit, as particularly described and claimed in my co-pending application, Serial No. 802,686, filed November 24th, 1913.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention, I have illustrated a portion of a chain type insulator, the units thereof being connected by devices constructed in accordance with the provisions of this invention.

Referring to the drawings for a detailed description of the parts illustrated, the reference character L indicates a disk of insulating material having loops or eyes 1 projecting from their adjacent faces.

The connecting member, or members, forming the subject matter of this invention are indicated at G and H. Obviously one only may be employed, if desired, but where two or more are used they may preferably be connected by ordinary closed chain links as 2.

In the construction illustrated, the members G and H appear in the shape of two-part chain links which coöperate with the link 2 to form a substantial flexible chain extending between the insulators L. While they are shown to be closed, they are nevertheless formed so that they may be opened whenever desired and may be again closed. While closed, they constitute connecting members of neat appearance and fully efficient strength.

In the drawings, each of the two parts, as 3 and 4, of the connecting member is U-shaped. The opposite ends as 5 and 6 of the legs of the part 3 are threaded, and the part 4 is disposed so that the ends of its legs abut the ends of the legs of the part 3. One leg of the part 4 is provided with a threaded socket 7 engaging the threads of the leg 5 of the part 3. The other leg of the part 4 is threaded and is provided with an adjustable sleeve 8 movable longitudinally along said threads and onto the threads of the leg 6 of the part 3.

By this construction it is apparent that, with the sleeve 8 adjusted to disengage from the threads of the leg 6, the part 4 may be bodily rotated to properly position the socket 7 upon the leg 5, or to move the sleeve carrying end out of alinement with the leg 6, in which position it is apparent that the part 4 will comprise a hook capable of engaging through a closed eye or the like, as for instance, through the loop 1 of insulators L.

After the socket 7 has been adjusted to bring the sleeve carrying leg into alinement with the leg 6, the sleeve 8 may be quickly and easily rotated to engage the threads of the leg 6. The link thus formed is capable of withstanding heavy mechanical strains.

Of course both ends of the part 4 may be provided with sleeves, as shown in the member G, if desired.

In order that no threaded surface may appear when the parts are connected and in use, the threaded portions of the parts 3 and 4 are only of such extent as will be covered and concealed by the sleeves. Likelihood of corrosion and rust of exposed threaded surface, and consequent inability to rotate the sleeve, is thus avoided. When a sleeve is moved backward upon one leg to disengage from another, it telescopes over an unthreaded portion of the first leg and some means should be provided for limiting such movement. Any suitable means may be employed, but for convenience and simplicity, I preferably form the parts 3 and 4 with their connecting portions angular, rather than semi-circular as is customary in ordinary chain links. By this means I provide positive shoulders, as 9, against which the sleeves may engage. It is intended that these shoulders arrest the downward movement of the sleeves when the upper surfaces or edges of the sleeves are flush or slightly below the upper ends of the respective legs. By this means the sleeves are always in position for quick use, and the angular arrangement of the connecting portions of the U's form positive and well defined pockets as 10 within which other members may engage, as is illustrated.

When it is desired to employ this connecting device as a strain member for the insulator, one part, as 3, may be molded partly within the material of the insulator so as to leave only the threaded ends of the legs 5 and 6 projecting. The other part of the device, as 4, may then be attached to and detached from the threaded legs at will, as will be more fully understood from an inspection of my co-pending application above referred to.

As many changes could be made in the above described construction, and various embodiments of the invention could be made without departing from the scope thereof, it is intended that all matter contained in the above description, or shown in the accompanying drawing, shall be interpreted as illustrative only, and not in a limiting sense, and that the following claims are intended to cover all the generic and specific features of the invention which may be said to fall within the language of said claims.

Having thus described my invention what I claim as new, and desire to secure by Letters Patent, is:

1. A two-part connecting member for insulators, each of said parts comprising a U-shaped member, the legs of one of said U-shaped members being threaded, one of the legs of the other of said U-shaped members being screw threaded and the other leg thereof formed with a threaded socket to receive the threaded end of the other of said U-shaped members, a separately formed sleeve threaded upon one of the legs of one of said members and being longitudinally movable on said leg to dispose a portion of its length for engaging threads upon the end of one of the legs of the other member, the connecting portions between the legs of each of said members being bent into angular formation so as to provide sheets for engaging a support, and so as to provide parts in angular relation to said legs forming shoulders for arresting movement of said sleeves in one direction.

2. A two-part connecting member for insulators, each of said parts comprising a U-shaped member, the legs of one of said U-shaped members being threaded, one of the legs of the other of said U-shaped members being screw threaded and the other leg thereof formed with an integrally formed threaded socket to receive the threaded end of the other of said U-shaped members, a separately formed sleeve threaded upon one of the legs of one of said members being longitudinally movable on said leg to dispose a portion of its length for engaging threads upon the end of one of the legs of the other member.

In testimony whereof, I affix my signature in the presence of two witnesses.

LOUIS STEINBERGER.

Witnesses:
L. GESSFORD HANDY,
NATHALIE THOMPSON.